July 19, 1949.　　　G. F. P. REICH　　　2,476,324
SEALING ASSEMBLY
Filed June 14, 1945
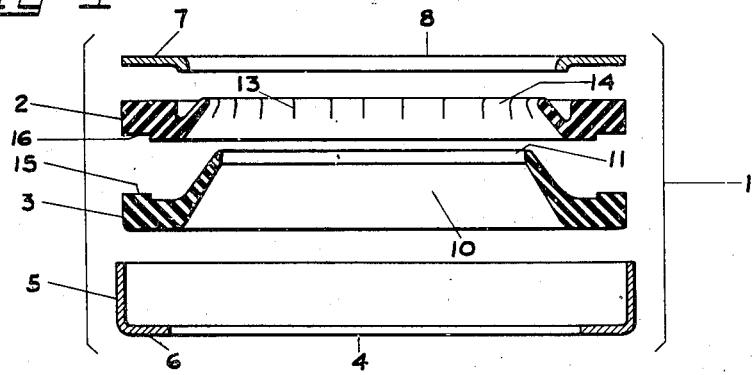
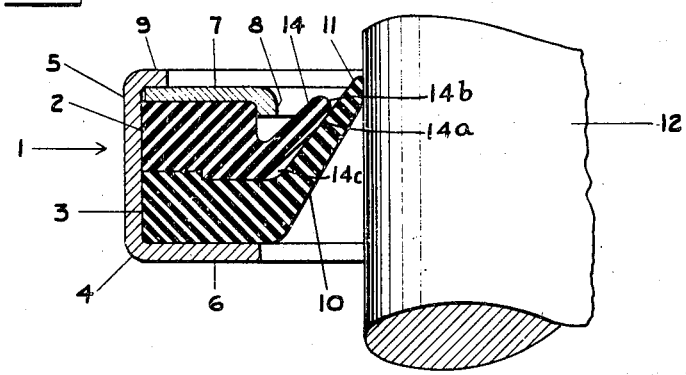
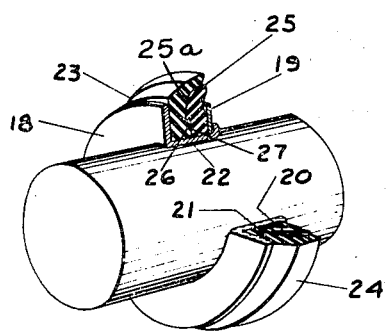
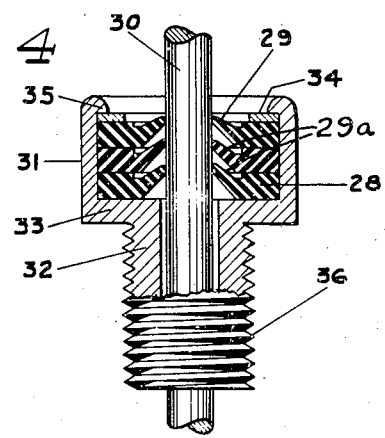
INVENTOR.
GEORGE F. P. REICH
BY
Ralph L Chappell
ATTORNEY Patented July 19, 1949

2,476,324

UNITED STATES PATENT OFFICE 2,476,324

SEALING ASSEMBLY

George F. P. Reich, Bremerton, Wash.

Application June 14, 1945, Serial No. 599,497

1 Claim. (Cl. 288—5)

(Granted under the act of March 3, 1883, as amended April 30, 1928; 370 O. G. 757)

This invention relates to sealing assemblies and particularly to pressure sealing assemblies.

An object of the invention is to provide an improved sealing assembly of such construction as to provide a fluid-tight seal with minimum friction.

Other objects of the invention are to provide an improved sealing assembly having sealing means adapted to be urged into sealing engagement with a shaft or other rotating or reciprocating member by tension means which is exposed to the pressure of fluid confined by the assembly; to provide an improved sealing assembly having a plurality of superimposed bodies of elastic material arranged in overlying axial alignment and adapted to coact in sealing against leakage without creating undue friction; to provide an improved sealing assembly wherein one body has a peripheral portion extending beyond the margin of the other body and engaged by the same, whereby fluid pressure exerted upon the latter body urges the peripheral portion of the first body into sealing position; to provide an improved sealing ring of such construction as to be capable of forming a fluid-tight seal in conjunction with a tension ring as well as providing mechanical packing independently of the tension ring; to provide improved elements and arrangements thereof in a sealing assembly of the character described and for the purposes set forth; and to accomplish the noted objects in a facile, economical and efficient manner.

In accomplishing these and other objects of the present invention, I have provided improved details of structure, the preferred forms of which are illustrated in the accompanying drawings, wherein:

Fig. 1 is an exploded, transverse, vertical, sectional view of a sealing assembly embodying the features of the present invention.

Fig. 2 is an enlarged, transverse, vertical sectional view of a portion of the sealing assembly in sealing engagement around a shaft.

Fig. 3 is a perspective view, partly in section, of a modified form of sealing assembly.

Fig. 4 is a transverse, vertical, sectional view of a plurality of superimposed sealing rings in packing relationship.

Referring more in detail to the drawings:

In Fig. 1, the numeral 1 designates a sealing assembly which includes a pair of superimposed annular bodies or rings 2 and 3, molded or otherwise formed of rubber or other suitable elastic material. Although the characteristics of the elastic material of the bodies 2 and 3 are subject to variation, it is preferable to employ an oil-resistant, synthetic composition, such as "neoprene" or "Hy-Car" (Buna N) having a Shore hardness of approximately 75. The elastic bodies are of substantially the same external diameter and are confined in abutting, axial alignment by an angular retaining ring or collar 4, of metal or other suitable material, which has an external, axial flange portion 5 encircling said bodies with a transverse flange portion 6 underlying the lower body 3. An annular, metallic plate or ring 7, having an internal peripheral lip or flange 8, overlies the upper body 2 and is held in engagement therewith by the external flange portion 5 of the collar 4 being bent inwardly upon itself and over the external margin of the plate as shown by the numeral 9 (Fig. 2). In this manner, the plate 7 is confined by the collar so as to clamp the elastic bodies therebetween as shown in Fig. 2.

The lower body 3 functions as a sealing ring or element and is substantially rectangular in cross-section, whereby its upper and lower surfaces are parallel and its external periphery is perpendicular to said surfaces. An annular flange portion or lip 10 is formed at the inner periphery of the body and extends above the upper surface of said body inwardly and upwardly preferably at an obtuse angle from the lower edge thereof. The lip 10 is substantially frusto-conical in shape and has its inner marginal edge bevelled or tapered to provide a bearing or sealing surface 11 for engaging the exterior of a shaft 12, or other rotating, or reciprocating member.

It is preferable that the lip be relatively thin or of reduced thickness so as to assure the same having sufficient flexibility. The particular shape, dimensions and inclination of the lip are subject to variation as controlled by the space provided for the accommodation of the sealing assembly and the pressure desired to be exerted by said lip upon the shaft. However, the lip should be directed upwardly and should be of sufficient vertical length to extend above the upper surface of the body 3 so as to have its inner peripheral portion terminating above or even with the upper surface of the upper body 2. It will be noted that the shaft 12 is of a diameter greater than the internal diameter of the lip, whereby said lip is deformed outwardly and upwardly with its sealing surface 11 snugly engaging said shaft.

For urging and maintaining the lip in sealing engagement with the shaft, the upper body 2 is adapted to function as a tension ring or member and is of a shape substantially complementary to the lower body 3. In other words, the upper and lower surfaces of the upper body are disposed in parallel planes which extend at a right angle to the plane of its external periphery. An inwardly-directed, annular lip or flange 14 extends upwardly at an inclination from the inner, lower peripheral portion of the upper body so as to engage the external inclined surface of the lip 10 below its upper margin. The flange 14 is relatively thin and is preferably of greater obtuse inclination than the lip, whereby only the inner peripheral portion of said flange engages said lip. This engagement occurs only over a limited area adjacent the outer or free end of the lip 14 as indicated by the numeral 14a (Fig. 2). The area of contact is rendered small not only by virtue of the difference in inclination between the lip 14 and the lip 10 but also by virtue of the free end of the lip 14 being rounded as shown in cross section at 14b (Fig. 2). Between the radially outward surface of the lip 10 and the radially inward surface of the lip 14 there exists a cavity 14c. Because of the rounded contour 14b of the free end of the lip 14 and because of the small area of contact 14a between the two lips, fluid can seep into the cavity 14c. Pressure is thereby transmitted from the main body of the fluid through the lip 14 and thence through the fluid in the cavity 14c to the radially outward portion of the lip 10 thereby exerting a greater sealing pressure on the lip 10 than would be possible without fluid in the cavity 14c.

For varying the tension of the flange 14 and adjusting the pressure exerted upon the lip 10, a plurality of equally-spaced, radial kerfs or slits 13 may be formed in said flange (Fig. 1). The quantity and spacing of the slits 13 control the frictional engagement of the lip with the shaft 12 and it is frequently desirable to eliminate said slits entirely. If desired, an upstanding, external peripheral rib or shoulder 15 may be made integral with the upper surface of the lower body and is adapted to coact with a complementary recess 16 formed in the lower surface of the upper body, whereby auxiliary means is provided for assisting in maintaining the elastic bodies in axial alignment.

As has been explained, the composition or material of the elastic bodies is subject to variation and it is preferable to employ an oil-resistant, synthetic composition. However, in some instances, it has been found desirable for the upper body to be of greater flexibility or elasticity than the lower body. This result may be obtained by forming one body of "neoprene" and the other body of "Hy-Car" or other synthetic rubber compositions having different characteristics.

Operation

The operation of a sealing assembly constructed as described herein is as follows:

The sealing assembly 1 is engaged around the shaft 12 and is held in position at a right angle to the axis of said shaft by suitable means (not shown). Since the inner periphery of the lip 10 is of less diameter than the shaft, said lip is deformed outwardly so that its sealing surface 11 snugly engages the exterior of said shaft. The sealing assembly is adapted to confine oil or other fluid under pressure and the lip of the lower body 3 as well as the flange 14 of the upper body 2 are directed toward the oil or fluid so as to be exposed to the pressure of the same. Due to the entire upper surface of the flange being exposed to the pressure of the fluid, said flange is distorted radially inwardly into more intimate contact with the lip. As a result, the inner peripheral portion of the lip is deformed radially inwardly so as to urge its sealing surface into more snug engagement with the shaft and provide a fluid-tight seal therearound. Additionally, pressure is brought to bear on the lip 10 by virtue of the fact that some of the fluid leaks by the rounded portion 14b of the flange 14, past the small area of contact 14a between the flange 14 into lip 10, and into the cavity 14c where it serves to transmit force to the radially outward portion of the lip 10.

If the flange is of greater elasticity or flexibility than the lip, the distortion of said flange is greater than the deformation of said lip. In any event, due to the full exposure of the flange, the pressure of the fluid has a more pronounced effect upon said flange and produces the desired seal without creating undue frictional resistance to the relative movement of the shaft. By the use of the slits 13 and by varying the quantity as well as the spacing of the same, fine adjustments of the pressure exerted by the lip upon the shaft may be obtained.

Modified forms

It is pointed out that a sealing assembly of the character described is not limited to the exact form illustrated in Figs. 1 and 2. Instead of being employed as an internal seal for a shaft or similar member, the assembly, when modified as shown in Fig. 3, is adaptable for use as an external seal in relatively movable sleeves or other cylindrical housings (not shown). The modified sealing assembly 17 includes an angular retaining ring or collar 18 and an annular plate or ring 19, similar to the collar 4 and ring 7 of the assembly 1, with annular elastic bodies 20 and 21 clamped therebetween. The collar 18 is provided with an internal, axial flange portion 22 of such diameter as to support the assembly 17 upon a shaft or other cylindrical member 22. Although the bodies 20 and 21 are formed of the same material and are of the same general contour as the bodies 2 and 3 of the assembly, said bodies 20 and 21 are of reversed construction. An annular, outwardly-directed lip 23 projects upwardly at an inclination from the lower portion of the external periphery of the body 21 and has its outer marginal edge bevelled or tapered to provide a bearing or sealing surface 24. For urging the latter into sealing contact with the bore of the sleeve or other cylindrical housing, an external, upwardly-inclined flange 25, similar to the flange 14 of the body 2, is made integral with the upper body 20. The outer peripheral portion of the flange 25 engages the inner inclined surface of the lip 23, whereby the pressure of the oil or other fluid within the sleeve or housing exerted upon said flange causes outward, radial distortion thereof and deforming of said lip and its surface 24 into sealing position. By virtue of the relative shapes and disposition of the lip 23 and the flange 25, a cavity 25a exists therebetween which functions in a manner similar to the cavity 14c in the modification shown in Fig. 2. The flexibility of the lip may be increased by the provision of slits similar to the slits 13 and the inclination of said lip is preferably less obtuse than the angle of the flange 25. The abutting surfaces of the bodies 20 and 21 may be provided with an annular, aligning rib 26 and coacting recess 27, with the rib being preferably formed on the upper surface of the lower body 21 at its internal margin.

Attention is also directed to the fact that the lower elastic body 3, Figs. 1 and 2, is susceptible of use independently of the upper body 2 so as to provide a mechanical packing. As shown in Fig. 4, a plurality of the elastic bodies or rings 28, each similar to the ring 3, are stacked in superimposed relation with their lips 29 engaging the exterior of a rod or shaft 30. Oil leakage receiving cavities 29a similar to that shown at 14c in Fig. 2 are located between adjacent lips 29. A cylindrical housing or retainer 31, of metal or other suitable material and having a reduced shank portion 32, surrounds the elastic bodies for maintaining the same in position around the shaft. Due to the reduced shank portion 32, an internal, radial shoulder 33 is formed to support the bodies and said bodies are confined between the shoulder and an annular plate or ring 34 which overlies the uppermost body. The upper margin of the housing is bent inwardly upon itself at substantially a right angle as shown by the numeral 35 so as to clamp the ring 34 in overlying relationship. In order to support the housing, external screw-threads 36 may be formed on the shank portion 32. Of course, the elastic bodies 3, Fig. 2, and 21, Fig. 3, may be used in a similar manner.

While I have shown certain embodiments of my invention, it is apparent that the device is susceptible to further modifications without departing from the spirit of the invention. I do not wish, therefore, to be limited by the disclosures set forth, but only by the scope of the appended claim.

The invention described herein may be manufactured and used by or for the Government of the United States of America for governmental purposes without the payment of any royalties thereon or therefor.

I claim:

A sealing assembly comprising a sealing ring of rubber-like material having a substantially radial annular portion and an axially extending frusto-conical lip portion integral with said annular portion, the thickness of said lip portion being substantially less along substantially its entire length than the thickness of said annular portion, and a tension ring of flexible rubber-like material disposed in the re-entrant angle between said axially extending frusto-conical portion and said radial portion of said sealing ring, said tension ring having a radially extending annular portion and a frusto-conical axially extending lip portion, the thickness of said lip portion at substantially all points along its length being substantially less than the thickness of said annular portion, the free end of said lip portion being rounded in cross section, the included angle of said frusto-conical portion of said tension ring being larger than the included angle of said frusto-conical portion of said sealing ring whereby the lip of said tension ring contacts the lip of said sealing ring substantially only in the area adjacent the free end of said lip of said tension ring.

GEORGE F. P. REICH.

REFERENCES CITED

The following references are of record in the file of this patent:

UNITED STATES PATENTS

| Number | Name | Date |
|---|---|---|
| 2,264,148 | Fisher et al. | Nov. 25, 1941 |
| 2,316,941 | Dodge | Apr. 20, 1943 |
| 2,326,286 | Bush | Aug. 10, 1943 |
| 2,397,847 | Dodge | Apr. 2, 1946 |